(12) United States Patent
Chang et al.

(10) Patent No.: US 11,344,386 B2
(45) Date of Patent: May 31, 2022

(54) MULTILAYER SHEET STRUCTURE FOR DENTAL APPLIANCE

(71) Applicant: USI Corporation, Kaohsiung (TW)

(72) Inventors: Moh-Ching Oliver Chang, Kaohsiung (TW); Tsai-Ting Hsu, Kaohsiung (TW); Yung-Shen Chang, Kaohsiung (TW)

(73) Assignee: USI CORPORATION, Kaohsiung (TW)

( * ) Notice: Subject to any disclaimer, the term of this patent is extended or adjusted under 35 U.S.C. 154(b) by 558 days.

(21) Appl. No.: 16/262,217

(22) Filed: Jan. 30, 2019

(65) Prior Publication Data
US 2020/0237478 A1 Jul. 30, 2020

(51) Int. Cl.
*A61C 7/08* (2006.01)
*B32B 27/08* (2006.01)
*B32B 27/30* (2006.01)
*B32B 27/32* (2006.01)
*B32B 27/36* (2006.01)
*B32B 27/28* (2006.01)
*B32B 27/34* (2006.01)

(52) U.S. Cl.
CPC ............... *A61C 7/08* (2013.01); *B32B 27/08* (2013.01); *B32B 27/285* (2013.01); *B32B 27/302* (2013.01); *B32B 27/308* (2013.01); *B32B 27/32* (2013.01); *B32B 27/34* (2013.01); *B32B 27/36* (2013.01); *B32B 2307/54* (2013.01); *B32B 2307/73* (2013.01); *B32B 2535/00* (2013.01)

(58) Field of Classification Search
CPC ......... A61C 7/08; B32B 27/08; B32B 27/285; B32B 27/302; B32B 27/308; B32B 27/32; B32B 27/34; B32B 27/36; B32B 2307/54; B32B 2307/73; B32B 2535/00
See application file for complete search history.

(56) References Cited

U.S. PATENT DOCUMENTS

| | | | | |
|---|---|---|---|---|
| 9,655,691 | B2 * | 5/2017 | Li | B32B 27/08 |
| 10,201,409 | B2 * | 2/2019 | Mason | B44C 1/227 |
| 10,549,511 | B2 * | 2/2020 | Stewart | B32B 27/08 |
| 2013/0302742 | A1 * | 11/2013 | Li | A61C 7/08 433/6 |
| 2019/0105881 | A1 * | 4/2019 | Stewart | B32B 27/325 |
| 2021/0153978 | A1 * | 5/2021 | Parkar | A61C 13/00 |

* cited by examiner

*Primary Examiner* — Ralph A Lewis
(74) *Attorney, Agent, or Firm* — Birch, Stewart, Kolasch & Birch, LLP

(57) ABSTRACT

A multilayer sheet for a dental appliance provided in the present disclosure includes a core layer having a tensile modulus greater than about 1400 MPa and an elongation at break greater than about 3%; and a first skin layer and a second skin layer sandwiching the core layer, wherein each of the first skin layer and the second skin layer independently has a water contact angle greater than 72° and/or a surface energy less than about 40 mN/m. The first skin layer and the second skin layer are the outermost layers of the multilayer sheet. A dental appliance made from the multilayer sheet structure is also provided.

17 Claims, 3 Drawing Sheets

MULTILAYER SHEET STRUCTURE FOR DENTAL APPLIANCE

BACKGROUND

Technical Field

The present disclosure relates to a multilayer sheet structure for a dental appliance, and a dental appliance using the same.

Description of the Related Art

The best-known dental appliance in the field of dental appliances might be said to be an orthodontic appliance. Since proper tooth arrangement is important for a person, from a health viewpoint as well as for aesthetics, the need for orthodontic devices has been gradually growing. The theory of orthodontics involves applying an external force to a tooth or teeth through an appliance placed on the tooth or teeth in a determined direction, and thus part of the periodontal ligament of the tooth or teeth is under pressure. The condition of the blood supply will be changed accordingly and thus the distribution of osteoblast and osteoclast will vary as well. In the end, the bones on one side of the teeth will be formed and the bones on the other side of the teeth will be absorbed. The alveolar bone can be remolded and a corrective effect can be achieved.

Conventional affixed orthodontic appliances used in a treatment traditionally have four basic elements: brackets, bonding materials, an arch wire, and ligature elastics (also known as "O-rings"). The brackets are temporary affixed to the subject's teeth, and the arch wire which is set on the brackets so as to exert continuous stress to the teeth. By having the arch line adjusted periodically by a practitioner, the teeth will be forced into their intended positions and therefore malocclusions will be corrected and appearance will be improved as well. From the viewpoint of strength and durability, the brackets and the arch line are usually made of metal, such as stainless steel.

However, conventional appliances with many components that show as metallic color on the teeth are unattractive, and the patient can feel uncomfortable during treatment. Therefore, another kind of orthodontic appliance has gradually attracted attention. The alternative method is to use plastic materials with a certain transmissivity of visible light to form an aligner to receive a tooth or teeth and to exert force on to the tooth or teeth, as disclosed in U.S. Pat. Nos. 6,450,807 and 6,964,564. A plurality of aligners that are slightly different from each other will be used in a typical treatment, and each of the aligners will be worn for an appropriate period of time. Through a series of designed and preformed aligners, the teeth will be incrementally repositioned to the desired arrangement. It is hard for others to notice the aligner, and even for the patient to perceive it, since this method utilizes plastic materials with a certain transmissivity and aligners that are almost conformal to the teeth. The aesthetics and the comfort are significantly improved.

However, dental appliances have to function in an environment of high humidity (the human oral cavity), and some dental appliances, such as orthodontic appliances, even have to provide a constant and a relatively long-term force on the wearer's teeth. It has been a challenge to balance durability, safety, and comfort. Consequently, while recently developed orthodontic treatment technologies, such as those described above, represent a considerable advancement in the field of orthodontics, additional advancements remain of interest and importance.

SUMMARY

In accordance with some embodiments of the present disclosure, a multi-layer sheet structure for a dental appliance is provided. The multilayer sheet structure for a dental appliance includes a core layer having a tensile modulus greater than about 1400 MPa and an elongation at break greater than about 3%; and a first skin layer and a second skin layer sandwiching the core layer, wherein each of the first skin layer and the second skin layer independently has a water contact angle greater than 72° and/or a surface energy less than about 40 mN/m. The first skin layer and the second skin layer are the outermost layers of the multilayer sheet. A dental appliance made from the multilayer sheet structure is also provided.

In some other embodiments of the present disclosure, another multi-layer sheet structure for a dental appliance is provided. The multi-layer sheet structure for a dental appliance includes a core layer having a tensile modulus greater than about 1400 MPa and an elongation at break greater than about 3%; and a first skin layer and a second skin layer sandwiching the core layer, wherein each of the first skin layer and the second skin layer independently is selected from the group consisting of, but not limited to, polyolefin, cyclic olefin polymer (COP), cyclic block copolymer (CBC), and a combination thereof. The first skin layer and the second skin layer are the outermost layers of the multilayer sheet.

In some embodiments of the present disclosure, a multi-layer dental appliance is provided. The multilayer dental appliance includes a shell having a cavity for receiving a tooth or teeth shaped to apply a force to the tooth or the teeth. The shell includes a core layer having a tensile modulus greater than about 1400 MPa and an elongation at break greater than about 3%; and a first skin layer and a second skin layer sandwiching the core layer, wherein each of the first skin layer and the second skin layer independently has a water contact angle greater than 72° and/or a surface energy less than about 40 mN/m. The first skin layer and the second skin layer are the outermost layers of the multilayer sheet.

A detailed description is given in the following embodiments with reference to the accompanying drawings.

BRIEF DESCRIPTION OF THE DRAWINGS

A better understanding of the features and advantages of the present disclosure will be obtained by reference to the following detailed description that sets forth embodiments, and the accompanying drawings of which.

DETAILED DESCRIPTION

Figure 1:
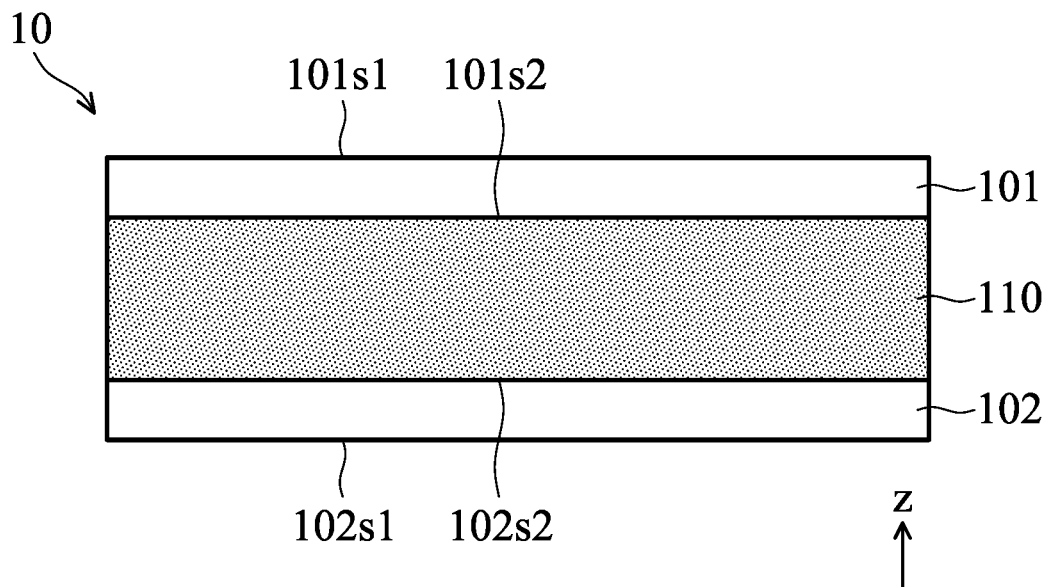
FIG. 1 illustrates an arrangement of a multi-layer sheet structure in accordance with some embodiments of the present disclosure.

The dental appliance of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first layer disposed on/over a second layer", may indicate the direct contact of the first layer and the second layer, or it may indicate a non-contact state with one or more intermediate layers between the first layer and the second layer. In the above situation, the first layer may not be in direct contact with the second layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, etc. may be used herein to describe various elements, components, layers, portions and/or sections, these elements, components, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The components in drawings are not drawn to scale.

The terms "about" and "substantially" typically mean +/−10% of the stated value, more typically mean +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

In addition, the phrase "in a range from a first value to a second value" indicates that the range includes at least the first value, the second value, and other integral values between them.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, a structure for a dental appliance is provided, more particularly to a multi-layer sheet structure. The term "dental appliances" used herein includes, but are not limited to, dental aligners, orthodontic retainers, anti-snoring devices and other may be worn on tooth or configured in oral cavity of human. In some embodiments, the present disclosure provides a structure for an orthodontic appliance. In some embodiments, the multi-layer sheet structure includes an inner layer (also called core layer) that possesses required mechanical strength and generates a force and/or torque to a tooth or teeth and hydrophobic outer layers (also called skin layers) which are hydrophobic and hence can prevent water (saliva) from penetrating into the inner layer in order not to have weakened mechanical strength of the inner layer. Therefore, the accuracy and reliability of the appliances may be improved.

Figure 4:
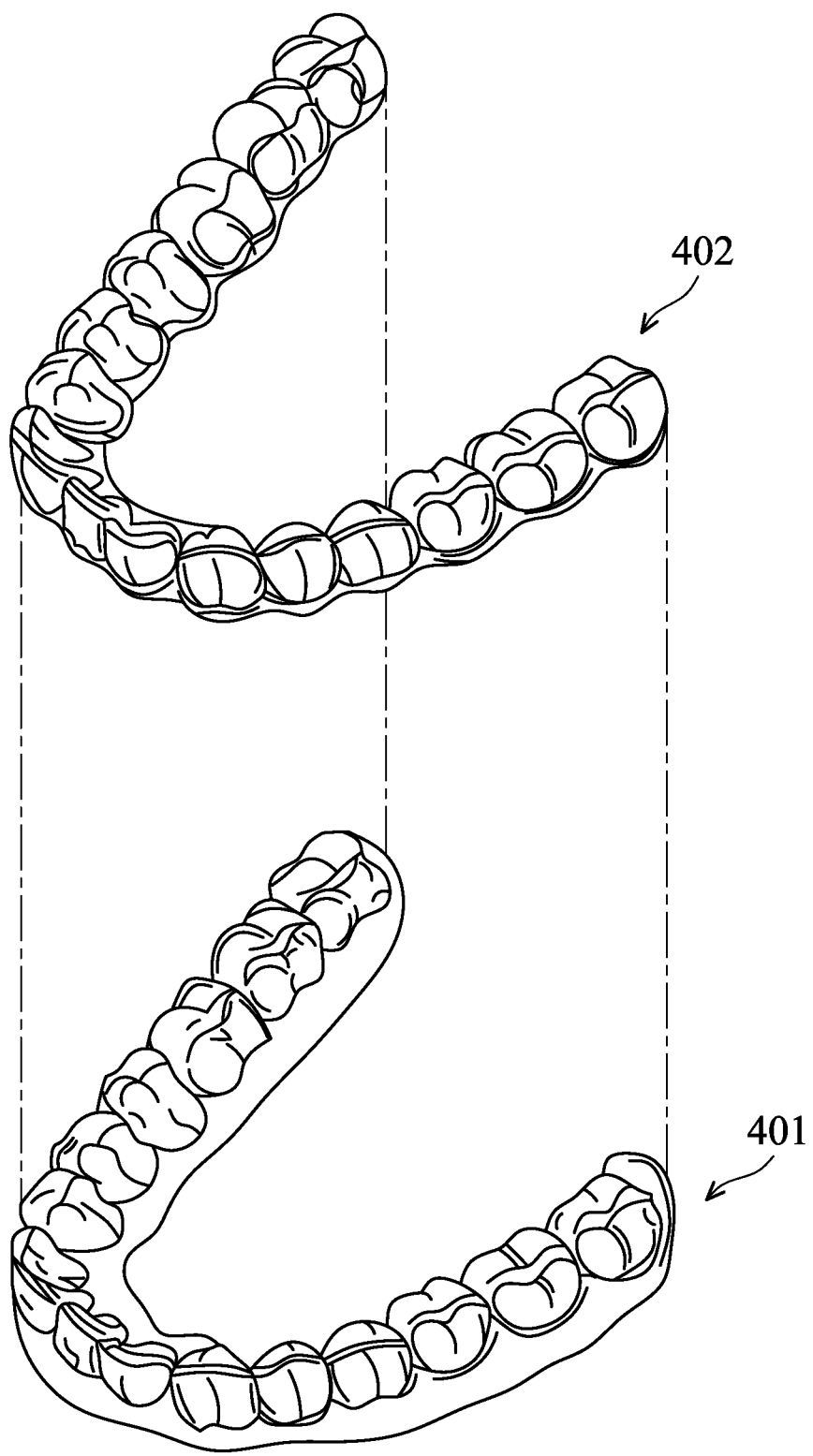
FIG. 4 illustrates a human jaw with teeth and an appliance for the teeth to diagrammatically show the relationship between the orthodontic appliance and the teeth.

In orthodontic treatment, it is necessary to apply a force to a tooth for generating movement of a tooth or teeth to make the tooth or the teeth toward its/their intended position(s) to obtain a better occlusion. An orthodontic appliance is a device that has teeth receiving cavities to receive and contact at least one of a patient's teeth to provide such force during a treatment. Generally, referring to FIG. 4, this kind of orthodontic appliances, such as an appliance 402 in FIG. 4, will has a cavity roughly fit the patient's teeth 401 and thus no further wires or other kinds of means will be needed for holding an appliance. However, in some cases depending on need, it may be desirable to have anchors on teeth with corresponding receptacles in the appliance in order to apply selected force on specific teeth. Some related exemplary appliances are described in U.S. Pat. Nos. 6,450,807 and 5,975,893. During the treatment, a plurality of orthodontic appliances may also be used to provide different force in different stage so that the teeth can be moved progressively to an intermediate or final position. The patient wears each of the appliances until the appliance can no longer provide enough force on the teeth or the teeth has been repositioned to their designated place for that given stage. Repetition of this process with successive appliances eventually moves the teeth to a final configuration through a series of intermediate stages. Therefore, if the orthodontic appliances degrade soon in human oral cavity, which means that the force each appliance provides decreases rapidly under high humidity, it will need more appliances per treatment to achieve expected position and/or even results in some other unwilling side effects which may affect the final result and lead to an undesirable outcome.

In some embodiments of the present disclosure, a dental appliance includes a multi-layer sheet structure. Referring to FIG. 1, the multi-layer sheet structure 10 may contain at least three layers, a first skin layer 101, a core layer 110, and a second skin layer 102. The core layer 110 is sandwiched between the first skin layer 101 and the second skin layer 102, and the skin layers are the outermost layers of the multi-layer sheet structure. The terms "outermost layer" used herein means a layer having a main surface exposed to the environment. The term "main surface" means a surface perpendicular to a lamination direction of the multi-layer structure. For example, in FIG. 1, the multi-layer sheet structure 10 has a lamination direction in a Z direction. The first skin layer 101 has two main surfaces 101s1 and 101s2, which are perpendicular to the Z direction. Similarly, the second skin layer 102 also has two main surfaces 102s1 and 102s2. The main surface 101s1 of the first skin layer 101 and the main skin layer 102s1 of the second skin layer 102 are exposed to the environment. In some embodiments, each layer in the multi-layer structure may include two or more layers.

The core layer 110 serves to provide sufficient physical strength so as to apply a predetermined force to teeth or a tooth, while the first skin layer 101 and the second skin layer 102, the outermost layers, serve to prevent water from entering into the core layer and protect it from plasticization by water (saliva). Therefore, a dental appliance including such structure may offer the predetermined force for a longer period of time, which increases the reliability and durability of the dental appliance.

In some embodiments of the present disclosure, the first skin layer 101 and the second skin layer 102 may independently include a hydrophobic material. The skin layers may be made from a single material, or may include a mixture of two or more materials.

In some embodiments of the present disclosure, each of the first skin layer 101 and the second skin layer 102 independently has at least one of the following properties: a contact angle to water greater than about 72° and a surface energy is less than about 40 mN/m, determined in accordance with the method described in [0065]. Preferably, each of the first skin layer 101 and the second skin layer 102 independently has at least one of the following properties: a contact angle to water greater than about 75° and a surface energy is less about 38 mN/m. More preferably, each of the first skin layer 101 and the second skin layer has at least one of the following properties: a contact angle to water greater than about 80 and a surface energy is less about 36 mN/m.

In some embodiments, the hydrophobic material may include, but is not limited to, a cyclic block copolymer (CBC), cyclic olefin polymer (COP), and styrenic block copolymer (SBC). The styrenic block copolymer includes, but is not limited to, styrene-ethylene-butylene-styrene (SEBS), styrene-ethylene-propylene-styrene (SEPS), and styrene-ethylene-ethylene-propylene-styrene (SEEPS).

The term "polymer" used herein means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term copolymer as defined hereinafter. Trace amounts of impurities (for example, catalyst residues) may be incorporated into and/or within the polymer. A polymer may be a single polymer, a polymer blend or polymer mixture.

The term "copolymer," as used herein, refers to polymers prepared by the polymerization of at least two different types of monomers. The generic term "copolymer" thus includes polymers prepared from two different types of monomers, and polymers prepared from more than two different types of monomers.

The term "block polymer" or "segmented copolymer" as used herein, refers to polymers having at least two or more chemically distinct regions or segments (referred to as "blocks") which are directly bonded or bonded via a connecting group in a linear manner, that is, a polymer comprising chemically differentiated units which are joined (covalently bonded) end-to-end with respect to polymerized functionality, rather than in pendent or grafted fashion.

In some embodiments, CBC is a substantially fully hydrogenated vinyl aromatic-conjugated diene block copolymer. In some embodiments, the term "substantially fully hydrogenated" means that at least 90 percent (%) of vinyl aromatic double bonds and at least 95% of conjugated diene double bonds are hydrogenated.

The substantially fully hydrogenated vinyl aromatic-conjugated diene block copolymers preferably have, prior to hydrogenation, a pentablock architecture with alternating styrene (S) blocks and either butadiene (B) blocks or isoprene (I) blocks.

Representative prehydrogenation pentablock copolymers include SBSBS pentablock copolymers and SISIS pentablock copolymers. The styrene (S) blocks may or may not be of equal length. Similarly, the butadiene (B) blocks and isoprene (I) blocks may or may not be of equal length.

The SBSBS-based and SISIS-based CBC pentablock copolymers have a pre-hydrogenation styrene content that is preferably greater than 10 percent by weight (wt %) to less than 70 wt %, more preferably within a range of from 25 wt % to 65 wt %, each wt % being based upon total pentablock copolymer weight prior to hydrogenation. The pentablock copolymers preferably have a pre-hydrogenation Mn that is preferably within a range of from 40,000 g/M to 150.000 g/M, more preferably within a range of from 50.000 g/M to 120,000 g/M, and even more preferably within a range of from 60,000 g/M to 90,000 g/M. Following hydrogenation, at least 90 percent (%) of vinyl aromatic (e.g. styrene) unsaturation (double bonds) present prior to hydrogenation and at least 90% of conjugated diene (e.g. butadiene or isoprene) unsaturation (double bonds) present prior to hydrogenation are hydrogenated or converted to saturated bonds. The percentage more preferably equals or exceeds 95%.

While sequentially polymerized pentablock copolymers may be preferred, satisfactory results also occur with use of triblock, multi-armed or coupled block copolymers. The multi-armed and coupled block copolymers contain a residue from a coupling agent. Such coupled block copolymers may be represented as, for example, X(BS)n where n is >1 and X represents a chain coupling agent. The coupled block copolymers preferably have the same styrene content and hydrogenation percentage as the sequential SBSBS and SISIS pentablock copolymers but a broader Mn range that is preferably from 40,000 g/M to 250,000 g/M, more preferably from 50,000 g/M to 200,000 g/M and even more preferably from 60,000 g/M to 160,000 g/M.

In some embodiments, the CBC may be a functionalized CBC. Examples include but not restricted to, silane-grafted CBCs, maleic anhydride grafted CBCs, acrylate-grafted CBCs, methacrylate-grafted CBCs and siloxanes-grafted CBCs.

The term "COP" is meant to encompass cyclic olefin polymers and cyclic olefin copolymers (COC). In some embodiments, COP may be produced by polymerizing at least one cyclic olefin with at least one acyclic olefin.

As used herein, "cyclic olefin", can refer to a compound containing a polymerizable carbon-carbon double bond that is either contained within an alicyclic ring. e.g., as in norbornene, or linked to an alicyclic ring, e.g., as in vinyl cyclohexane. Polymerization of the cyclic olefin provides a polymer comprising an alicyclic ring as part of or pendant to the polymer backbone. In some embodiments, the cyclic olefins can include, but are not limited to, norbornene, substituted norbornenes, cyclopropene, cyclo-butene, cyclopentene, methylcyclopentene, vinylcyclohexene, 5-vinyinorbornene, 5-methylnorbornene, 5-ethylidene-norbornene, 2-adamantylidene, 2-vinyl adamantane, tetra-cyclododecene, and/or combinations thereof.

Suitable cyclic olefin polymers for use in the present disclosure may include ethylene-norbornene polymers: ethylene-dicyclopentadiene polymers: ethylene-norbornene-dicyclopentadiene terpolymers; ethylene-norbornene-ethylidene norbornene terpolymers; ethylene-norbornene-vinylnorbornene terpolymers, and so on.

In some embodiments of the present disclosure, the hydrophobic material may include, but is not limited to, a polyolefin.

In some embodiments, the polyolefin means homopolymers and copolymers of linear or branched $C_2$-$C_{12}$ alpha-olefins, such as ethylene, propylene, 1-butene, 1, 3-butadiene, 1-pentene, 1-heptene, 1-octene, 1-nonene, 1-decene. In some other embodiments, the polyolefin means homopolymers and copolymers of linear or branched $C_2$-$C_{10}$ alpha-olefins. In some embodiments, the polyolefin may include polyethylene (PE), polypropylene (PP), polybutylene (PB-1), and polybutadiene. In some embodiments, melt flow rate of the polyolefin may be 0.1~100 g/10 mins at the condition of 230° C./2.16 kg.

In some embodiments, the core layer 110 disposed between the first skin layer 101 and the second skin layer 102 has at least one of properties: a tensile strength at yield is greater than about 40 MPa, a tensile modulus is greater than about 1400 MPa, and an elongation at break is greater than about 3%, determined in accordance with American Society for Testing and Materials (ASTM) D638. Preferably, in some other embodiments, the core layer 110 has at least one of properties: a tensile strength at yield is greater than about 45 MPa, a tensile modulus is greater than about 1600 MPa. and an elongation at break is greater than about 8%, determined in accordance with ASTM D638.

In some embodiments, the core 110 layer may have a tensile modulus greater than about 1400 MPa and an elongation at break greater than about 3%. Preferably, the core 110 layer may have a tensile modulus greater than about 1600 MPa and an elongation at break greater than about 8%.

In some embodiments, the core layer 110 may include a polyamide (PA), a polycarbonate (PC), polyester or the combination thereof.

The term "polyamide" used herein means a polymer containing amide linkages (—CONH—) occurring along the molecular chain of the polymer. In some embodiments, the polyamide may include nylon 6, nylon 66, nylon 12, nylon 46, nylon 610, nylon 11, nylon 612, nylon 88, nylon 99, nylon 1010 or a combination thereof. PA may include a polyamide product based on aliphatic, cyclo-aliphatic, and aromatic blocks such as Grilamid® TR55 supplied by EMS. The term "polycarbonate" as used herein embraces those polycarbonates comprising repeating units or residues of the formula

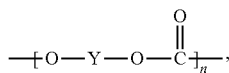

wherein Y is a divalent aromatic or aliphatic radical derived from a dihydroxyaromatic compound or a dihydroxyaliphatic compound of the formula HO—Y—OH. Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane. In some embodiments, the polycarbonate may be a bisphenol A polycarbonate. The term "polyester" used herein encompasses both "homopolyesters" and "copolyesters" and means a synthetic polymer prepared by the polycondensation of dicarboxylic acids with dihydric alcohols or by polycondensation of a monomer containing a carboxyl group and a hydroxyl group. Examples of polyester include but not limit to polyethylene terephthalate (PET), polybutylene terephthalate (PBT), polybutylene succinate (PBS), polyethylene terephthalate glycol (PETG), poly cyclohexylenedimethylene terephthalate glycol (PCTG), and Tritan.

In some embodiments, the first skin layer and the second skin layer in a multi-layer structure may independently have a thickness ranging from about 10 μm-500 μm, preferably from about 15 μm-400 μm, and much preferably from about 20 μm-300 μm. If the thickness of a skin layer is too thin, a blocking ability of the skin layer to prevent water permeating into the core layer may decrease significantly. In some embodiments, a core layer in a multi-layer structure may have a thickness ranging from about 100 μm-1,500 μm, preferably from about 150 μm-1400 μm, and more preferably from about 250 μm to about 1200 μm. If the core layer is too thin, a desirable mechanical strength of the multi-layer structure may not be achieved. However, if the skin layers or the core layer is/are too thick, the cost will be too high and an experience of wearing will become undesirable as well.

In some embodiments, the ratio of thickness of a first skin layer to the thickness of a core layer, or the ratio of thickness of a second skin layer to the thickness of a core layer may be 1/20-1/3. For example, the ratio of thickness between a first skin layer and a core layer, or the ratio of thickness between a second skin layer and a core layer may be 1/18-1/4. If the thickness of the skin layer accounts for too much portion, the strength of the multi-layer structure will decrease significantly; however, if the thickness of a core layer accounts for too much portion, the waterproof properties of the skin layers may be negatively affected.

Figure 2:
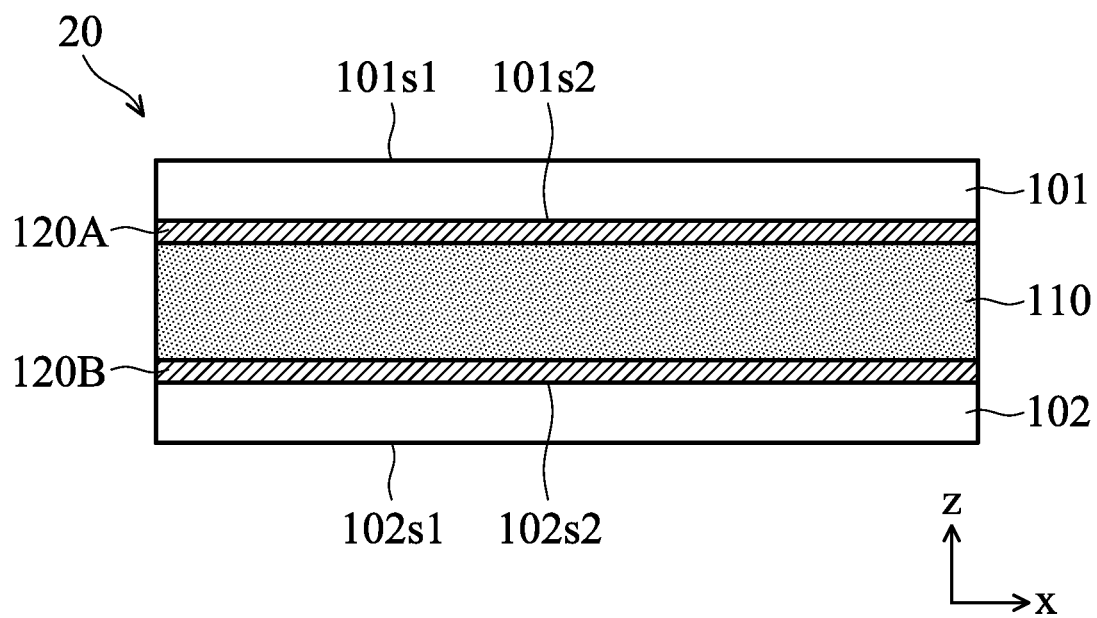
FIG. 2 illustrates an arrangement of a multi-layer sheet structure in accordance with some other embodiments of the present disclosure.

In some embodiments, for better adhesion between the skin layer and the core layer, a multi-layer structure may optionally include a tie layer. The tie layer functions as a layer which ties or bonds together the different layers that the tie layer directly contacts. Referring to FIG. 2, the multi-layer structure 20 includes tie layers 120A and 120B. The tie layer 120A is disposed between the first skin layer 101 and the core layer 110, and the tie layer 120A directly contact to the first skin layer 101 and the core layer 110. In a similar way, the tie layer 120B is disposed between the second skin layer 102 and the core layer 110, and the tie layer 120B directly contact to the second skin layer 102 and the core layer 110.

In some embodiments of the present disclosure, at least the skin layers are the outermost layers, a multi-layer structure may be skin layer/tie layer/core layer/tie layer/skin layer (which can be shortly represented as S/T/C/T/S). The symbol "/" means "directly attach to". In some other embodiments, a multi-layer structure may be, but is not limited to, S/T/C/T/S/T/C/T/S, S/T/S/T/C/T/S/T/S, S/T/CT/S/T/C/T/S/T/C/T/S, and so on. In some other embodiments, a multi-layer structure may be skin layer (1)/tie layer/core layer/tie layer/skin layer (2), where skin layer (1) and skin layer (2) are not the same and are made of different polymers or polymer mixtures, but both layers having a water contact angle greater than 72° and/or a surface energy less than about 40 mN/m. The structure can be shortly represented as $S_1$/T/C/T/$S_2$.

In some embodiments, the tie layer provides a sufficient adhesion between the core layer and at least one of the first skin layer and the second skin layer. In particular, the tie layer may provide a sufficient adhesion to prevent delamination of layers. In some embodiments, the sufficient adhesion between the tie layer and the core layer, or between the tie layer and the first skin layer or the second skin layer may refer to a T-peel strength greater than 8 Nt/25 mm measured in accordance with ASTM D1876-08. The tie layer may be made from a mixture of materials of the core layer and the first skin layer.

In some embodiments, a tie layer may include, but is not limited to, terpolymer adhesive polymers (such as ethylene acrylic acid (EAA), ethylene ethylacrylate (EEA), ethylene methylacrylate (EMA), ethylene vinyl acetate (EVA), and ethylene methyl acrylic acid (EMAA)), maleic anhydride grafted polyethylene (MAH-g-PE or PE-graft-MAH or PE-graft-MAH), maleic anhydride grafted polypropylene (MAH-g-PP or PP-graft-MAH or PP-g-MAH), maleic anhydride grafted EVA (EVA-g-MAH), maleic anhydride grafted EBA (EBA-g-MAH), or maleic anhydride grafted EMA (EMA-g-MAH) or a maleic anhydride grafted polymer comprising ethylene monomer. Examples of commercially available maleic anhydride grafted polymers comprising ethylene monomer that can be used in some embodiments include AMPLIFY™ TY 1053H, AMPLIFY™ TY 1057H, AMPLIFY™ TY 1052H, and AMPLIFY™ TY 1151, each of which are available from The Dow Chemical Company; BYNEL 41E710, BYNEL 4033, BYNEL 4140, FUSABOND E Series functionalized ethylene-based modifiers and M Series random ethylene copolymers available from DuPont; and OREVAC OE825 from Arkema. Examples of maleic anhydride grafted polymers comprising ethylene monomer that can be used in a tie layer include maleic anhydride grafted polyethylene, maleic anhydride grafted ethylene acrylate, maleic anhydride grafted ethylene vinyl acetate, and combinations thereof. The tie layer may also include a material that is conventionally used by a person skilled in this art for adhering polymers, such as ethylene alkyl acrylate copolymers (e.g. AMPLIFY EA from The Dow Chemical Company, ELVALOY AC from DuPont, and LOTRYL from Arkema), ethylene vinyl acetate copolymers. An ethylene alkyl acrylate copolymer can be ethylene methyl acrylate, ethylene ethyl acrylate, ethylene butyl acrylate, or combinations thereof.

In some embodiments, the tie layer may include a mixture of a material of the core layer and at least one material of the first skin layer and the second skin layer. In some embodiments, the tie layer may include at least one material of ethylene-vinyl acetate (EVA), ethylene and acrylic acid (EAA), maleic anhydride grafted polypropylene (PP-graft-MAH), maleic anhydride grafted polyethylene (PE-graft-MAH), maleic anhydride grafted EVA (EVA-g-MAH), maleic anhydride grafted EBA (EBA-g-MAH), and maleic anhydride grafted EMA (EMA-g-MAH); and at least one material of the core layer, the first skin layer, and the second skin layer. When the tie layer contains a material that used in the layer the tie layer directly attaches to, it may further enhance the compatibility between the layer and the tie layer and thus the adhesion between them may be reinforced as well.

In some embodiments, the tie layer may comprise a recycled film or scrap from a final product. Scrap product may be recycled back into the product for economic reasons (low production unit ratio and good raw material utilization) and for environmental reasons (reduce landfill). Although recycling the film scrap back into some high demanded layer, such as skin layer with high transparency, will result in a "less than prime" blend which will reduce some physical properties of final products, utilizing in a tie layer is acceptable. Further, since a tie layer polymer must be adherable to an overlying layer and a underlying layer that the tie layer directly contact, a blend of the two polymer materials used in the up layer and the down layer will usually be compatible and it may raise the adhesion. Film or sheet recycled from edge trim, scrap roll recycle, or off-grade material can be recycled or back-blended into the tie layer. The recycle content of the tie layer will typically be from about 0.1 weight percent to about 50 weight percent, preferably from about 0.5 weight percent to about 20 weight percent.

In some embodiments, a tie layer may be made from a single ingredient or made from more than one material.

In some embodiments, a tie layer may have a thickness ranging from about 1 µm-100 µm, preferably from about 2 µm-90 µm, and more preferably from about 5 µm to about 80 µm.

In some embodiments of the present disclosure, the thickness ratio of each of the tie layer in the multi-layer sheet structure may be about $1.5 \times 10^{-3}$-0.1. Preferably, the thickness ratio of the tie layer in the multi-layer sheet structure may be about 0.015-0.075. In some embodiments, the presence of the tie layer may significantly increase the adhesion between the skin layer and the core layer to avoid delamination.

In some embodiments of the present disclosure, each layer in the multi-layer structure may be subjected to a surface modifying process so as to obtain better adhesion between layers or change some properties depending on need. The surface modifying process may be a chemical process or a physical process. The surface modifying process may include, but is not limited to, a laser process, UV-light exposure, and a chemical grafting process, plasma process, corona treatment, and flame treatment. In some embodiments, in order to obtain better appearance of a dental appliance, each layer of a multi-layer structure of the dental appliance may be partially or almost transparent to visible light through utilizing materials that are partially or almost transparent to visible light. For example, using CBC to form skin layers and using transparent polyamide, such as Grilamid® TR55 (a polyamide product based on aliphatic, cyclo-aliphatic, and aromatic blocks) supplied by EMS to form a core layer.

In some embodiments, the total thickness of the multi-layer sheet structure may be about 0.4 mm-1.8 mm. Preferably, the total thickness of the multilayer sheet structure may be about 0.5 mm-1.2 mm. If the total thickness of the multilayer sheet structure is too thick, it will negatively affect the wearing experience. If the total thickness of the multilayer sheet structure is too thin, the strength of the multilayer structure may be unsatisfied.

In some embodiments, different portions of an appliance can contain different material compositions in order to produce different localized stiffness or for complying with other demands. For instance, the different localized stiffness may be used to generate localized forces and/or torques that are customized to the particular underlying teeth, and some parts of the appliance may have lower transmissivity of visible light since the parts would not be seen from the outside under a regular circumstance.

In some embodiments of the present disclosure, each layer of the multi-layer structure may include one or more conventional additives. Illustrative additives include antioxidants, mold release agents, ultraviolet light stabilizers, processing aids, lubricants, anti-static agents, antimicrobial agents (e.g. ALPHASA™ RC2000 or MICROBAN™), colorants, coloring agents, and dyes.

The orthodontic appliances according to some embodiments of the present disclosure may be fabricated through various methods. For instance, a method for making the appliance may include forming the multi-layer sheet by such as hot press, co-extrusion or lamination, and then transforming the multi-layer sheet into an orthodontic appliance by heating the multi-layer sheet to soften it and then molding the softened multi-layer sheet to form a pre-designed shape by such as vacuum forming or compression molding or thermoforming. The method may further include other process depending on need, such as trimming and removing some portion of the appliance.

The multilayer structures of the present disclosure may provide various improved properties for dental appliances, such as an aligner used in orthodontic treatment. For instance, the aligner comprising the multilayer structures may possess better durability because the core layer of the multilayer structures encompass desired mechanical properties and the skin layers of the multilayer structures may provide a shield layer for preventing the core layer being plasticized by human's saliva Since the durability of the aligner is increased, less aligners are needed in a course of an orthodontic treatment, which may facilitate the course and reduce the number of appliances used in the treatment. Thus, it may further reduce the whole cost of the course as well.

Below, exemplary embodiments will be described in detail with reference to accompanying drawings so as to be easily realized by a person having ordinary knowledge in the art. The inventive concept may be embodied in various forms without being limited to the exemplary embodiments set forth herein.

Unless stated to the contrary, implicit from the context, or customary in the art, all temperatures are in ° C., and unless otherwise stated herein, all Examples were conducted under room temperature (25±3° C.).

Table 1 below lists the materials used in the Examples (polypropylene (PP), styrene-ethylene-butylene-styrene (SEBS), cyclic block copolymer (CBC), ethylene acrylic acid (EAA), maleic anhydride grafted polypropylene (PP-graft-MAH or PP-g-MAH), polyamide (PA), polyethylene terephthalate glycol (PETG), and thermoplastic polyurethane (TPU)) and some basic properties of them. The melt volume flow rate (MVR) measures the rate at which a sample passes vertically through a capillary under a defined weight load. The MVR is measured in cubic cm per 10 minutes (cm$^3$/10 min) in accordance with ASTM D1238. The contact angle is measured by placing a drop of water on a material and using a Dataphysics OCA 1 contact angle analyzer to determine the contact angle. Then the surface energy is calculated according to Wu's method (ref. *J. Polym. Sci.* 43 (1971), P. 19-30.), which is also known as the harmonic-mean method and can be expressed as the equation below:

$$\gamma_{AB} = \gamma_A + \gamma_B - \frac{4\gamma_A^d \cdot \gamma_B^d}{\gamma_A^d + \gamma_B^d} - \frac{4\gamma_A^p \cdot \gamma_B^p}{\gamma_A^p + \gamma_B^p},$$

wherein $\gamma_{AB}$ is a solid-liquid surface tension; $\gamma_A$ is solid surface energy $\gamma_B$ is liquid surface tension; $\gamma_A^d$ is dispersive solid surface tension: $\gamma_B^d$ is dispersive liquid surface tension; $\gamma_A^p$ is polar solid surface tension; and $\gamma_B^p$ is polar liquid surface tension. If $\gamma_B^d$ and $\gamma_B^p$ of the two testing liquids are known, the dispersive $\gamma_A^d$ and polar $\gamma_A^p$ components of the solid surface tension can be obtained from the contact angles of the two liquids by solving the two quadratic equations simultaneously.

TABLE 1

| | | Brand/Trade name | MVR (cm$^3$/10 min) | Contact angle | Surface energy |
|---|---|---|---|---|---|
| Skin layer | PP | LCY/ST866K | 9.3 (230° C./2.16 kg) | 95.8° | 24.7 mN/m |
| | SEBS | Asahi Kasei/ Asaflex 825 | 1.22 (190° C./2.16 kg) | 89.8° | 22.4 mN/m |
| | CBC | USI Corporation/ ViviOn 1608 | 0.3 (190° C./2.16 kg) | 99.2° | 24.8 mN/m |
| Tie layer | EAA | DuPont/ Nucrel 30707 | — | — | — |
| | PP-g-MAH | Arkema/ Orevac 18722 | 7 (230° C./72.16 kg) | — | — |
| Core layer | PA | EMS/TR55 | — | — | — |
| | PETG | Eastman/GN001 | — | — | — |
| | TPU | Lubrizol/ isoplast2530 | — | — | — |

Preparation of Specimen

Example 1

CBC (14 cm*14 cm*100 um, length/width/thickness), EAA (14 cm*14 cm*50 um), PA (14 cm*14 cm*1000 um), EAA (14 cm*14 cm*50 um), CBC (14 cm*14 cm*100 um) were laminated in such an order and then the lamination was hot pressed by a floor standing hydraulic laboratory press (Carver CMG30H-15-OX) at 240° C. and the clamp force is 20 tons. The dimension of the product after the press is 1.2 mm*14 cm*14 cm. The hot-pressed lamination was cut into a specimen with a size of 50 mm×10 mm×1.2 mm.

Example 2

PP (14 cm*14 cm*100 um), PP-g-MAH (14 cm*14 cm*50 um), PA (14 cm*14 cm*1000 um), PP-g-MAH (14 cm*14 cm*50 um), PP (14 cm*14 cm*100 um) were laminated in such an order and then the lamination was hot pressed by a floor standing hydraulic laboratory press (Carver CMG30H-15-OX) at 240° C. and the clamp force is 20 tons. The dimension of the product after the press is 1.2 mm*14 cm*14 cm. The hot-pressed lamination was cut into a specimen with a size of 50 mm×10 mm×1.2 mm.

Example 3

CBC (14 cm*14 cm*100 um), PP-g-MAH (14 cm*14 cm*50 um), PETG (14 cm*14 cm*1000 um), PP-g-MAH (14 cm*14 cm*50 um), CBC (14 cm*14 cm*100 um) were laminated in such an order and then the lamination was hot pressed by a floor standing hydraulic laboratory press (Carver CMG30H-15-OX) at 240° C. and the clamp force is 20 tons. The dimension of the product after the press is 1.2 mm*14 cm*14 cm. The hot-pressed lamination was cut into a specimen with a size of 50 mm×10 mm×1.2 mm.

Example 4

SEBS (14 cm*14 cm*100 um), EAA (14 cm*14 cm*50 um), PA (14 cm*14 cm*1000 um), EAA (14 cm*14 cm*50 um), SEBS (14 cm*14 cm*100 um) were laminated in such an order and then the lamination was hot pressed by a floor standing hydraulic laboratory press (Carver CMG30H-15-OX) at 240° C. and the clamp force is 20 tons. The dimension of the product after the press is 1.2 mm*14 cm*14 cm. The hot-pressed lamination was cut into a specimen with a size of 50 mm×10 mm×1.2 mm.

The difference of the thickness of each layer in the multi-layer sheet after the hot pressed is less than 5%.

Comparative Example A-1

A TPU sheet with a thickness of 0.76 mm was die cut into an ASTM D638 Type IV specimen.

Comparative Example A-2

A TPU sheet with a thickness of 1.2 mm was cut into a specimen with a size of 50 mm×10 mm.

Comparative Example B-1

A PA film with a thickness of 0.8 mm was die cut into an ASTM D638 Type IV specimen.

Comparative Example B-2

A PA film with a thickness of 1.2 mm was cut into a specimen with a size of 50 mm×10 mm.

Comparative Example C-1

A PETG film with a thickness of 0.75 mm was die cut into an ASTM D638 Type IV specimen.

Comparative Example C-2

A PETG film with a thickness of 1.2 mm was cut into a specimen with a size of 50 mm×10 mm.

Comparative Example D-1

A CBC film with a thickness of 0.89 mm was die cut into an ASTM D638 Type IV specimen.

Comparative Example E-1

A PP film with a thickness of 0.75 mm was die cut into an ASTM D638 Type IV specimen.

Comparative Example F-1

A SEBS film with a thickness of 0.76 mm was die cut into an ASTM D638 Type IV specimen.

The specimens used in Examples are organized as shown below in Table 2.

TABLE 2

| | Composition of the specimen |
|---|---|
| Example 1 | CBC/EAA/PA/EAA/CBC |
| Example 2 | PP/PP-g-MAH/PA/PP-g-MAH/PP |
| Example 3 | CBC/PP-g-MAH/PETG/PP-g-MAH/CBC |
| Example 4 | SEBS/EAA/PA/EAA/SEBS |
| Comparative Example A-1, A-2 | TPU |
| Comparative Example B-1, B-2 | PA |
| Comparative Example C-1, C-2 | PETG |
| Comparative Example D-1 | CBC |
| Comparative Example E-1 | PP |
| Comparative Example F-1 | SEBS |

[Mechanical Properties of Specimens]

Mechanical properties (Tensile-at-yield, Elongation-at-yield, Elongation-at-break and Modulus) of the specimens of Example 1-4 and Comparative Example A-1, B-1, C-1, D-1, E-1, and F-1 are measured in accordance with ASTM D638, Type IV, at a rate 12.7 mm/min, and the results are summarized in Table 3 below.

TABLE 3

| | Thickness mm | Tensile-at-yield MPa | Elongation-at-yield % | Elongation-at-break % | Modulus MPa |
|---|---|---|---|---|---|
| Example 1 | 1.2 | 59.2 (2.4) | 6.9 (0.11) | 76.1 (20.7) | 1460.1 (41.8) |
| Example 2 | 1.2 | 57.6 (1.3) | 7.1 (0.06) | 82.9 (21) | 1593 (41) |
| Example 3 | 1.17 | 34.5 (1.6) | 3.7 (0.15) | ~200 | 1355 (50) |
| Example 4 | 1.19 | 57.3 (1) | 6.6 (0.16) | 64.6 (30) | 1678 (9) |
| Comparative Example A-1 | 0.76 | 70.4 (1) | 5.8 (0.2) | 112.3 (31) | 1911 (30) |
| Comparative Example B-1 | 0.8 | 76.9 (6.5) | 6.8 (0.16) | 56.5 (24.6) | 2034.7 (170.2) |
| Comparative Example C-1 | 0.75 | 51.1 (1.4) | 3.6 (0.1) | 215.6 (32) | 2010.9 (13) |
| Comparative Example D-1 | 0.89 | >17.3 | | >190 | >640 |

TABLE 3-continued

|  | Thickness mm | Tensile-at-yield MPa | Elongation-at-yield % | Elongation-at-break % | Modulus MPa |
|---|---|---|---|---|---|
| Comparative Example E-1 | 0.75 | 26.9 (1) | 9.4 (0.2) | 668 (1.6) | 118.7 (7) |
| Comparative Example F-1 | 0.75 | >15 |  | >170 | >500 |

The number in the bracket is standard deviation (STDEV).

As shown in Table 3, the multi-layer structures (Examples 1-4) possess desirable mechanical strength (such as high modulus, tensile-at-yield and elongation-at-yield) which may result from the core layer in the each structure. For instance, despite the specimen of Example 1 contains CBC, which possesses unsatisfied mechanical strength as shown in Comparative Example A, the specimen of Example 1 still maintains certain degrees of the mechanical strength.

[Assessment of Durability Under High Humidity]

The specimens of Example 1-4 and Comparative Example A-2 to C-2 were equipped with a strain jig that applies approximately 3.5 percent (3.5%) strain deformation (calculated in accordance with ASTM D543) to each specimen. A clamped specimen was placed into a container that holds a volume of water sufficient to allow complete sample immersion and the clamped specimen was fully immersed in the water for 3 days at a set point temperature of 37° C. (for simulating a circumstance of human oral cavity). After a pre-determined period, each clamped specimen was removed from the water and then the strain jig was removed from the each specimen. Afterwards, the sample specimen was patted to dry. Specimens were prescreened for tensile testing by inspecting each dried specimen for visual defects such as craze lines, stress marks, peeling off and breakage. No delamination was observed by visual inspection and the test specimens that contain other visual defects were excluded from further test steps. Each specimen that lacks visual defects was mounted on the grips in an Instron 5565A machine and was subjected to ASTM D882 tensile testing. The testing region between the two grips was 25.4 mm*10 mm*1.2 mm, the stretching rate was 12.7 mm/min and the test was conducted at room temperature. Under tensile testing, the stress value at tensile elongation of 5% was recorded. The percentage of tensile stress decay for each tested specimen was recorded, and the outcomes are organized in Table 4 below. The results are also shown in FIG. 3.

TABLE 4

|  | Tensile stress decay | | |
|---|---|---|---|
| Passed Time (hr) | 0 | 25 | 70 |
| Example 1 | 0.0% | −5.0% | −11.7% |
| Example 2 | 0.0% | −9.0% | −8.4% |
| Example 3 | 0.0% | −12.4% | −13.0% |
| Example 4 | 0.0% | −14.8% | −15.8% |
| Comparative Example A-2 | 0.0% | −15.1% | −18.3% |
| Comparative Example B-2 | 0.0% | −11.0% | −21.1% |
| Comparative Example C-2 | 0.0% | −24.2% | −23.0% |

Figure 3:
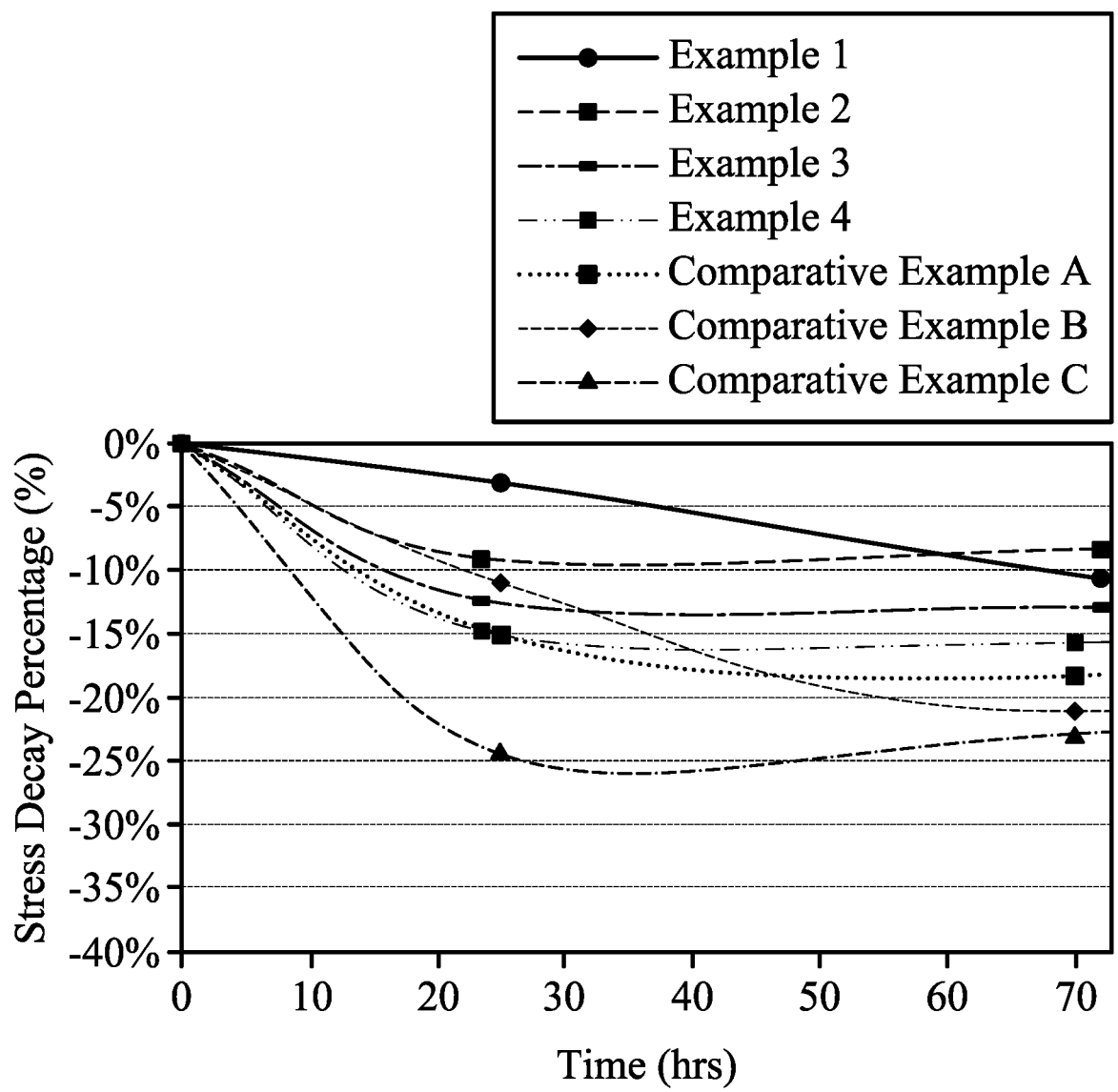
FIG. 3 shows a comparison of different structures in mechanical strength decay under a condition simulating human oral cavity.

Referring to Table 4 and FIG. 3, more than 18% of a tensile strength was reduced in all of the monolayer specimens (Comparative Example A-2 to C-2) after the specimens were soaked in water for 70 hours. Conversely, a tensile strength of the specimens using the multi-layer sheet structure of the present disclosure (Example 1-4) only decreased less than 16% after being soaked in water for 70 hours. The multi-layer structure effectively restrains the fluctuation of strength in a circumstance with high humidity and thus improves its long-term durability.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A multilayer sheet for a dental appliance, comprising:
   a core layer having a tensile modulus greater than about 1400 MPa and an elongation at break greater than about 3%;
   a first skin layer and a second skin layer sandwiching the core layer, wherein each of the first skin layer and the second skin layer independently has a water contact angle greater than 72° and/or a surface energy less than about 40 mN/m; and
   a tie layer between the core layer and at least one of the first skin layer and the second skin layer, wherein the tie layer comprises ethylene-vinyl acetate (EVA), ethylene-methyl acrylate (EMA), ethylene and acrylic acid (EAA), maleic anhydride grafted polypropylene (PP-graft-MAH), maleic anhydride grafted polyethylene (PE-graft-MAH), maleic anhydride grafted EVA (EVA-g-MAH), maleic anhydride grafted EBA (EBA-g-MAH), maleic anhydride grafted EMA (EMA-g-MAH), or a combination thereof;
   wherein the first skin layer and the second skin layer are outermost layers of the multilayer sheet.

2. The multilayer sheet as claimed in claim 1, wherein each of the first skin layer and the second skin layer independently is made of a hydrophobic material comprising a cyclic block copolymer (CBC), a cyclic olefin polymer (COP), a polyolefin, a styrenic block copolymer (SBC), or a combination thereof.

3. The multilayer sheet as claimed in claim 1, wherein each of the first skin layer and the second skin layer independently comprises a cyclic block copolymer (CBC), a cyclic olefin polymer (COP), styrene-ethylene-butylene-styrene (SEBS), and styrene-ethylene-propylene-styrene (SEPS), styrene-ethylene-ethylene-propylene-styrene (SEEPS), polyethylene (PE), polypropylene (PP), or a combination thereof.

4. The multilayer sheet as claimed in claim 1, wherein the core layer comprises a polyamide (PA), a polycarbonate (PC), polyethylene terephthalate glycol (PETG) or a combination thereof.

5. The multilayer sheet as claimed in claim 1, wherein a T-peel strength of an adhesion between the tie layer and the core layer, or between the tie layer and the first skin layer or the second skin layer is greater than 8 Nt/25 mm.

6. The multilayer sheet as claimed in claim 1, wherein the tie layer further comprises:
at least one material of the core layer, the first skin layer, and the second skin layer.

7. The multilayer sheet as claimed in claim 1, wherein a thickness of the tie layer is from about 1-100 μm.

8. The multilayer sheet as claimed in claim 1, wherein a thickness of the core layer is from about 100-1,500 μm, and a thickness of the first skin layer and the second skin layer independently is from about 10-500 μm.

9. The multilayer sheet as claimed in claim 1, wherein a ratio of thickness of the first skin layer to a thickness of the core layer, or a ratio of thickness of the second skin layer to the thickness of the core layer is 1/20-1/3.

10. The multilayer sheet as claimed in claim 1, wherein the multilayer sheet has a tensile stress decay percentage less than 16% after being submerged in 37° C. water for 70 hours at 3.5% strain.

11. The multilayer sheet as claimed in claim 1, wherein the core layer further has a tensile strength at yield greater than about 40 MPa.

12. The multilayer sheet as claimed in claim 1, wherein a total thickness of the multilayer sheet is from about 0.4-1.8 mm.

13. A multilayer sheet for a dental appliance, comprising:
a core layer having a tensile modulus greater than about 1400 MPa and an elongation at break greater than about 3%;
a first skin layer and a second skin layer sandwiching the core layer, wherein each of the first skin layer and the second skin layer independently is selected from the group consisting of polyolefin, cyclic olefin polymer (COP), cyclic block copolymer (CBC), styrenic block copolymer (SBC) and a combination thereof;
a tie layer between the core layer and at least one of the first skin layer and the second skin layer, wherein the tie layer comprises ethylene-vinyl acetate (EVA), ethylene-methyl acrylate (EMA), ethylene and acrylic acid (EAA), maleic anhydride grafted polypropylene (PP-graft-MAH), maleic anhydride grafted polyethylene (PE-graft-MAH), maleic anhydride grafted EVA (EVA-g-MAH), maleic anhydride grafted EBA (EBA-g-MAH), maleic anhydride grafted EMA (EMA-g-MAH), or a combination thereof;
wherein the first skin layer and the second skin layer are outermost layers of the multilayer sheet.

14. The multilayer sheet as claimed in claim 13, wherein a ratio of thickness between the first skin layer and the core layer, or a ratio of thickness between the second skin layer and the core layer is about 1/20-1/3, and the total thickness of the multilayer sheet is from about 0.4-1.8 mm.

15. The multilayer sheet as claimed in claim 13, wherein the core layer further has a tensile strength at yield greater than about 40 MPa; and
each of the first skin layer and the second skin layer independently has a water contact angle greater than 72° and/or a surface energy is less about 40 mN/m.

16. The multilayer sheet as claimed in claim 13, wherein a T-peel strength of an adhesion between the tie layer and the core layer, or between the tie layer and first skin layer or the second skin layer is greater than 8 Nt/25 mm.

17. A multilayer dental appliance, comprising:
a shell having a cavity for receiving a tooth or teeth shaped to apply a force to the tooth or the teeth, wherein the shell comprising:
a core layer having a tensile modulus greater than about 1400 MPa and an elongation at break greater than about 3%;
a first skin layer and a second skin layer sandwiching the core layer, wherein each of the first skin layer and the second skin layer independently has a water contact angle greater than 72° and/or a surface energy is less about 40 mN/m;
a tie layer between the core layer and at least one of the first skin layer and the second skin layer, wherein the tie layer comprises ethylene-vinyl acetate (EVA), ethylene-methyl acrylate (EMA), ethylene and acrylic acid (EAA), maleic anhydride grafted polypropylene (PP-graft-MAH), maleic anhydride grafted polyethylene (PE-graft-MAH), maleic anhydride grafted EVA (EVA-g-MAH), maleic anhydride grafted EBA (EBA-g-MAH), maleic anhydride grafted EMA (EMA-g-MAH), or a combination thereof;
wherein the first skin layer and the second skin layer are outermost layers of the multilayer sheet.

* * * * *